United States Patent
Kawamura et al.

(10) Patent No.: US 9,907,144 B2
(45) Date of Patent: Feb. 27, 2018

(54) ILLUMINATION SYSTEM (71) Applicant: PANASONIC INTELLECTUAL PROPERTY MANAGEMENT CO., LTD., Osaka (JP)

(72) Inventors: Ryo Kawamura, Osaka (JP); Kentaro Yamauchi, Osaka (JP); Kohji Hiramatsu, Osaka (JP); Akihiro Kishimoto, Osaka (JP); Tatsumi Setomoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 29 days.

(21) Appl. No.: 15/063,672

(22) Filed: Mar. 8, 2016

(65) Prior Publication Data
US 2016/0270189 A1 Sep. 15, 2016

(30) Foreign Application Priority Data

Mar. 12, 2015 (JP) ................. 2015-049838

(51) Int. Cl.
H05B 37/02 (2006.01)
H05B 33/08 (2006.01)
G03B 21/00 (2006.01)

(52) U.S. Cl.
CPC ..... H05B 37/0227 (2013.01); H05B 33/0869 (2013.01); G03B 21/005 (2013.01)

(58) Field of Classification Search
CPC . H05B 37/0218; H05B 33/0869; G03B 21/00
See application file for complete search history.

(56) References Cited

U.S. PATENT DOCUMENTS

2010/0295456 A1* 11/2010 Ko ............. H05B 33/0869
                                              315/154
2012/0306381 A1* 12/2012 Adler ............... F21S 2/00
                                              315/152

(Continued)

FOREIGN PATENT DOCUMENTS

JP          5319999 B2    10/2013

*Primary Examiner* — Douglas W Owens
*Assistant Examiner* — Pedro C Fernandez
(74) *Attorney, Agent, or Firm* — Greenblum & Bernstein, P.L.C.

(57) ABSTRACT

An illumination system includes a light projection device, an illuminance measurement unit, a lighting device, and a control device. The light projection device projects an image to a space. The illuminance measurement unit measures an illuminance value of a location where the illuminance measurement unit is placed in the space. The lighting device has a dimming function for illuminating the location in the space with a brightness. The control device includes an illuminance setting unit, a difference calculation unit, and an illumination light adjusting unit. The illuminance setting unit sets an illuminance value of the location. The difference calculation unit calculates a difference between the illuminance value set by the illuminance setting unit and the illuminance value measured by the illuminance measurement unit. The illumination light adjusting unit adjusts a brightness of the lighting device such that the difference calculated by the difference calculation unit is reduced.

12 Claims, 6 Drawing Sheets

(56) References Cited

U.S. PATENT DOCUMENTS

2014/0263977 A1* 9/2014 Jones .................... G01J 1/4204
                                                    250/214 AL
2015/0145418 A1* 5/2015 Pope ................. H05B 33/0854
                                                        315/152
2016/0330820 A1* 11/2016 Doh ................... H05B 37/0218

* cited by examiner

ILLUMINATION SYSTEM

CROSS-REFERENCE TO RELATED APPLICATIONS

This application claims priority to Japanese Patent Application No. 2015-049838 filed on Mar. 12, 2015, the entire contents of which are incorporated herein by reference.

TECHNICAL FIELD

The disclosure relates to an illumination system using a light projection apparatus and a lighting device.

BACKGROUND ART

Conventionally, in a product exhibition in a show window and a stage performance in event facilities, there has been used illumination presentation in which light from an illumination apparatus such as a spotlight is projected on an object to attract the attention of customers or audience and strengthen the impression of the product or the performance. As a system for performing such illumination presentation, there is known an illumination apparatus which selects, from a preset base shape group, a base shape of an illumination light and determines a position to which the illumination light of the selected base shape is projected such that an object is covered by the illumination lights of one or more base shapes (see, e.g., Japanese Unexamined Patent. Application Publication No. 5319999). Such an illumination apparatus can project an image to a space or an object by using a projector capable of setting the specifications of the illumination light, the shape of the illumination light, the size of the illumination light and the like.

However, in the case of projecting an image by using a light projection device such as the illumination apparatus described above, a brightness of a space is controlled by the illumination light from a lighting fixture disposed in the space and the light of the image. Therefore, if the image temporally changes, the brightness of the space is changed. In the case of using the above-described presentation, it is general that a dimming rate of the lighting fixture is set to a low level in order to brighten the projected image. Accordingly, if the image has a bright color, the space becomes bright. On the contrary, if the image has a dark color, the space becomes dark. Recently, a visual work such as reading or document work is done in, e.g., a cafeteria or an exhibition hall, using the above-described presentation. Therefore, if the brightness of the space is changed by the color of the image, it may be difficult to obtain an illumination environment where a user can comfortably perform a visual work.

SUMMARY OF THE INVENTION

In view of the above, the disclosure provides an illumination system capable of providing an illumination environment where a user can comfortably perform a visual work while performing presentation by projecting an image by using a light projection device.

In accordance with an aspect of the disclosure, there is provided an illumination system which includes a light projection device, an illuminance measurement unit, a lighting device, and a control device. The light projection device is configured to project an image that temporally changes into a space. The illuminance measurement unit is configured to measure an illuminance value of a location where the illuminance measurement unit is placed in the space. The lighting device has a dimming function for illuminating the location in the space with a brightness. The control device is configured to control the light projection device and the lighting device. The control device includes an illuminance setting unit, a difference calculation unit, and an illumination light adjusting unit. The illuminance setting unit is configured to set an illuminance value of the location. The difference calculation unit is configured to calculate a difference between the illuminance value set by the illuminance setting unit and the illuminance value measured by the illuminance measurement unit. The illumination light adjusting unit is configured to adjust a brightness of the lighting device such that the difference calculated by the difference calculation unit is reduced.

In one aspect of this disclosure, even when the brightness of the projection light is changed due to the change in the image projected from the light projection device, the control device can maintain an illuminance value on a work surface by changing the brightness of the illumination light from the lighting device. Therefore, it is possible to obtain an illumination environment where a user can comfortably perform a visual work while enjoying the presentation of the image projected from the light projection device.

BRIEF DESCRIPTION OF THE DRAWINGS

The figures depict one or more implementations in accordance with the present teaching, by way of example only, no by way of limitations. In the figures, like reference numerals refer to the same or similar elements.

DETAILED DESCRIPTION

An illumination system according to a first embodiment will be described with reference to FIGS. 1 to 4. As can be seen from FIG. 1, an illumination system 1 of the present embodiment includes a light projection device (e.g., projector 2) for projecting an image that temporally changes to an object in a space 10, control device 3 for controlling the projector 2, and a lighting device 4 for illuminating an optional location in the space 10 with an optional brightness. The control device 3 is wired or wirelessly connected to an input unit 5 through which a user U inputs operation commands of the projector 2 and the lighting device 4. The illumination system 1 further includes an illuminance measurement unit 6 for measuring an illuminance value of a certain position in the space 10.

Figure 1:
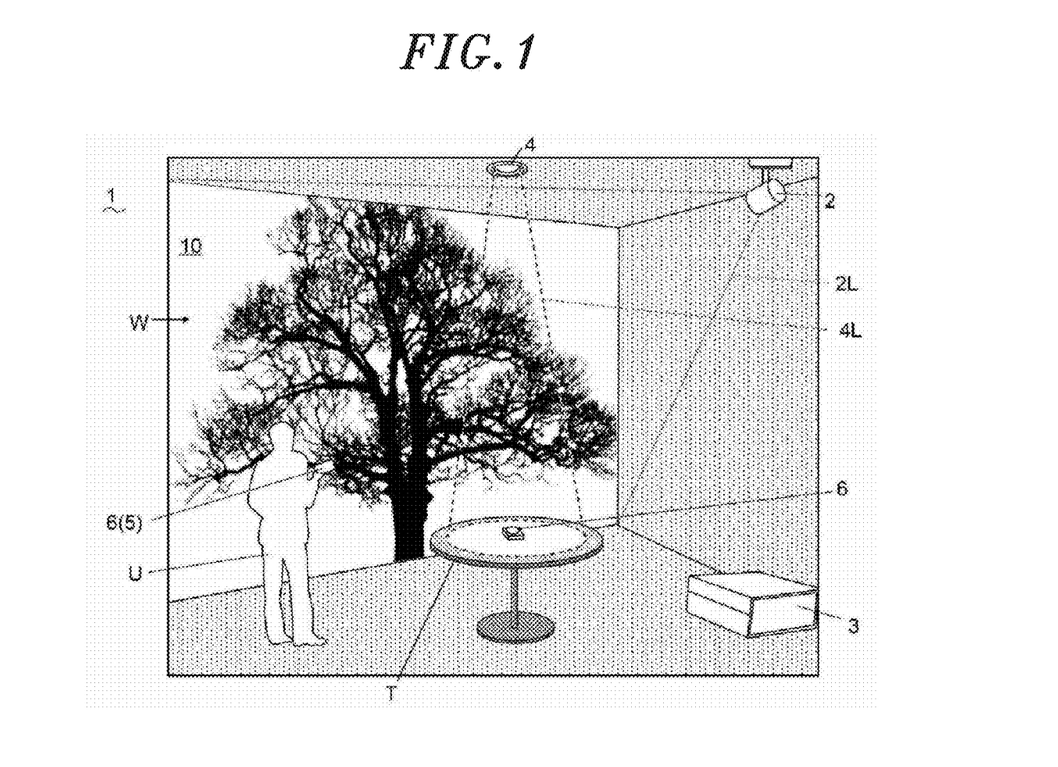
FIG. 1 is a perspective view showing a configuration of an illumination system according to a first embodiment.

In the illumination system 1, a projection light 2L is projected from the projector 2 by the user's manipulation of the input unit 5, so that a specific projection range in the space 10 and an object (wall W in the drawing) are illuminated brightly. In the drawing, the projector 2 and the control device 3 are illustrated as separate members. However, the projector 2 may include a part or the whole of the configuration of the control device 3.

The projector 2 has a projection unit for projecting an image as an illumination light. As the projector 2, there may be used a general-purpose liquid crystal projector, a digital light processing (DLP) projector or the like. As a light source of the projector 2, there may be used a metal halide lamp, LED, laser or the like. The control device 3 and the projector 2 can communicate a control signal in a wired or wireless manner, and include a communication unit, e.g., a wiring connection terminal conforming to HDMI, an LAN system conforming to 100 base-t, a wireless LAN conforming to IEEE 802.11 or the like.

The lighting device 4 irradiates an illumination light 4L to an optional indoor location where the projection light 2L from the projector 2 is not projected. Although, in FIG. 1, a ceiling embedded-type downlight is illustrated as the lighting device 4, the lighting device 4 is not limited thereto and may be, e.g., a spotlight, a pendent-type lighting fixture, a bracket attached to a wall, or the like. As for light distribution of the lighting device, narrow angle light distribution or middle angle light distribution is preferred to avoid overlap of the illumination light 4L with the projection light 2L and to restrictively illuminate a work surface of a specific location where a visual work is done.

The illuminance measurement unit 6 is a general-purpose illuminance sensor. The illuminance measurement unit 6 measures illuminance values of the optional location, in the space 10, illuminated by the lighting device 4. For example, in FIG. 1, the illuminance measurement unit 6 is provided on a table T disposed immediately below the lighting device 4. The illuminance measurement unit 6 transmits illuminance values measured at a preset time interval to the control device 3. As the illuminance measurement unit 6, a dedicated device may be used, or an illumination sensor included in an electronic appliance such as a portable terminal, a personal computer or the like, or an electric home appliance such as an air conditioner, an air cleaner or the like may be used. Further, a plurality of illuminance measurement units 6 may be used so that illuminance values of a plurality of locations can be measured. The input unit 5 may have function of the illuminance measurement unit.

Figure 2:
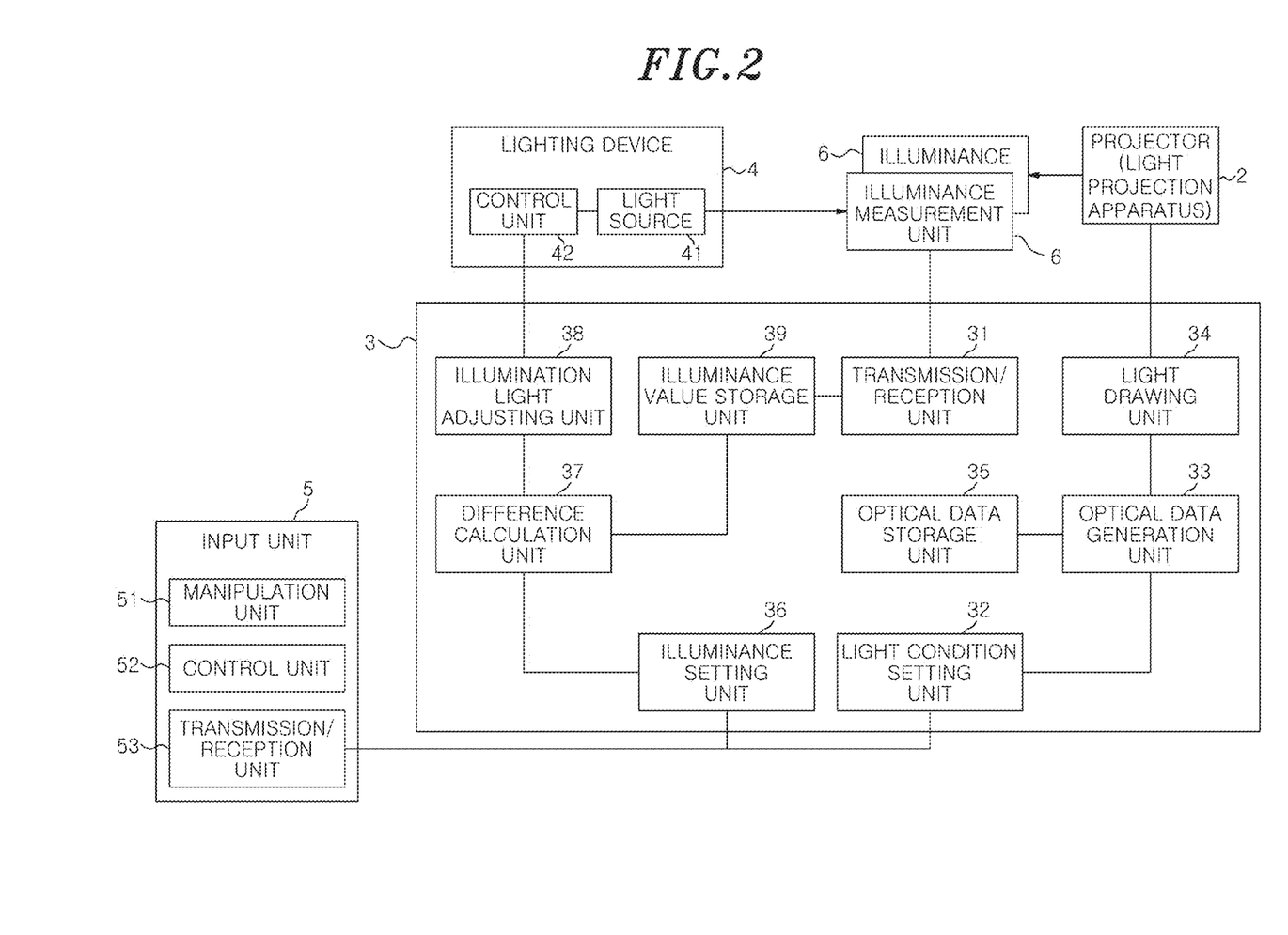
FIG. 2 is a block diagram of the illumination system according to the first embodiment.

As shown in FIG. 2, the control device 3 includes a transmission/reception unit 31 for transmitting/receiving a communication signal to and from the illuminance measurement unit 6 in a wired or wireless manner. The control device 3 includes a light condition setting unit 32 for setting specification and condition of the projection light 2L and an optical data generation unit 33 for generating optical data based on the specification and the condition set by the light condition setting unit 32. Further, the control device 3 includes a light drawing unit 34 for generating light drawing data by performing a drawing process with the optical data, and an optical data storage unit 35 for storing the optical data generated by the optical data generation unit 33. The projector 2 projects light by using the light drawing data generated by the light drawing unit 34.

The light condition setting unit 32 sets specifications and conditions of a plurality of projection lights 2L by the user's manipulation. The specifications of the light include a brightness (dimming rate) or a color temperature of the projection light 2L. A general illumination light has a light color such as incandescent color, warm white, white, neutral white, daylight color, and the like. However, in the present embodiment, the light color may include the primary light colors such as red, green, and blue or mixed colors thereof. When a plurality of projection lights 2L is overlapped, the light condition setting unit 32 may assign individual layers to the respective projection lights, and set a transparency of a color with respect to each layer.

The light condition includes a position to which light is projected within a specific projection range of the space 10, a shape of light projected to a preset position, and a size of light having a preset shape. The light condition setting unit 32, based on set specifications of the light, sets central coordinates of the projection light 2L within a range where the projection light 2L from the projector 2 can be irradiated. Further, the light condition setting unit 32 sets a two-dimensional projection shape of the projection light 2L associated with the central coordinates. Furthermore, the light condition setting unit 32 sets a height and a width of the projection shape of the projection light 2L.

The optical data generation unit 33 generates an optical data by integrating the characteristic information such as the specifications, the position, the shape, and the size of the light, which are set by the light condition setting unit 32. The control device 3 includes a data storage unit 35 in which the optical data is stored. The data storage unit 35 is included in the optical data generation unit 33.

When a light for illumination is included in the projection light 2L, the characteristic information includes at least one of an illuminance, a brightness, a luminous intensity, a luminous flux, a color temperature, and a color rendering property. When a light for image display is included in the projection light 2L, the characteristic information includes an image such as a moving image, a still image, and an image containing text and lines. The optical data generation unit 33 generates an optical data specified by the characteristic information and outputs the generated optical data to the light drawing unit 34. The optical data generation unit 33 or the light drawing unit 34 stores the optical data or the light drawing data in a data storage unit (not shown) and reads out such data by manipulation of the user U. Since the light drawing data that has been once set is reproduced, the user U does not need to perform a new setting process as long as the illumination system 1 is used under the same conditions, which enhances convenience.

The light drawing unit 34 generates the light drawing data by performing the drawing process by using the optical data outputted from the optical data generation unit 33. The light drawing data is transmitted from the control device 3 to the projector 2 and the projection light 2L is irradiated from the projector 2.

As the projector 2, there may be used a general-purpose liquid crystal projector, a digital light processing (DLP) projector or the like. As a light source of the projector 2, it is preferable to use a metal halide lamp, LED, laser or the like. The control device 3 and the projector 2 can communicate a control signal in a wired or wireless manner, and include, e.g., a wiring connection terminal conforming to HDMI, an LAN system conforming to 100 base-t, a wireless LAN conforming to IEEE 802.11 or the like.

The lighting device 4 includes a light source 41 and a control unit 42 for controlling a dimming rate of the light source 41. As the light source 41, there is used, e.g., an LED lighting device capable of changing a dimming rate by changing an ON duty ratio of a PWM (Pulse Width Modulation) dimming signal. The light source 41 is not limited to the LED lighting device and may be an incandescent lamp, a fluorescence lamp, an organic EL light emitting device or the like as long as the dimming function can be realized. The control unit 42 is configured to supply a driving current suitable for the type of the light source 41 such that the light source 41 is turned on based on the dimming signal transmitted from the control device 3.

The input unit 5 includes a manipulation unit 51 having manipulation buttons or a touch panel, a control unit 52 for generating an operation signal based on an operation command inputted from the manipulation unit 51, and a transmission/reception unit 53 for transmitting the operation signal to the control device 3. A user U can change at least one set parameter of the specification, the position, the shape and the size of the light by using the input unit 5. The input unit 5 includes, as a part of the configuration of the manipulation unit 51, an inclination measurement unit (not shown) for measuring an inclination of the input unit 5. The operation signal may be generated from the measured inclination. As the input unit 5, a general-purpose presentation mouse is preferably used, for example. Although it is illustrated in FIG. 2 that the operation signal from the input unit 5 is directly transmitted to the light condition setting unit 32, the operation signal is actually transmitted via the transmission/reception unit 31 for transmitting/receiving the communication signal to and from the illuminance measurement unit 6.

The control device 3 includes an illuminance setting unit 36 for setting an illuminance value of a location where the illuminance measurement unit 6 is placed, and a difference calculation unit 37 for calculating a difference between an illuminance value set by the illuminance setting unit 36 and an illuminance value measured by the illuminance measurement unit 6. The control device 3 further includes an illumination light adjusting unit 38 for adjusting the brightness of the lighting device 4 such that the difference calculated by the difference calculation unit 37 is reduced. The control device 3 further includes an illuminance value storage unit 39 for storing the illuminance value measured by the illuminance measurement unit 6.

The data on the illuminance value measured by the illuminance measurement unit 6 is transmitted to the control device 3, stored in the illuminance value storage unit 39 via the transmission/reception unit 31, and outputted to the difference calculation unit 37. The illuminance measurement unit 6 constantly transmits an illuminance value measured at a preset time interval, e.g., 10 seconds, to the control device 3. The control device 3 may be configured such that when the light drawing unit 34 transmits the light drawing data to the projector 2, the transmission/reception unit 31 transmits to the illuminance measurement unit 6 a trigger signal which turns on the illuminance measurement unit 6 to detect an illuminance value. The illuminance setting unit 36 reads out the illuminance value set by the user from the operation signal transmitted from the input unit 5, and outputs data on the read-out illuminance value to the difference calculation unit 37.

The difference calculation unit 37 outputs to the illuminance light adjusting unit 38 the data on the difference between the illuminance value set by the illuminance setting unit 36 and the illuminance value measured by the illuminance measurement unit 6. The illuminance value (brightness of the space) measured by the illuminance measurement unit 6 is controlled by illumination light 4L from the lighting device 4 and reflected light generated by reflection of the projection light 2L on the object such as a wall W or the like. In the space where the illumination system 1 is applied, the dimming rate of the lighting device 4 is initially set to 50% or less so that the image projected from the projector 2 can be seen.

The illumination light adjusting unit 38 generates a dimming signal for adjusting the brightness of the lighting device 4 based on the difference calculated by the difference calculation unit 37, and transmits the dimming signal to the lighting device 4. For example, when the light source 41 of the lighting device 4 is controlled by the PWM dimming signal, the illumination light adjusting unit 38 gradually increases or decreases the on duty ratio such that the difference is reduced. The lighting device 4 is operated at the on duty ratio obtained when the illuminance value measured by the illuminance measurement unit 6 is substantially the same as the illuminance value set by the illuminance setting unit 36.

In FIG. 1, the image projected from the projector 2 has a bright color and a high brightness, and the brightness of the table T serving as a work surface is affected by not only the illumination light 4L from the lighting device 4 but also the reflected light generated by the reflection of the projection light 2L from the projector 2 on the wall W. If the illuminance value set by the illuminance setting unit is 500 lx and the illuminance value measured by the illuminance measurement unit 6 installed at the table T is 500 lx, the illuminance value difference is zero and, thus, the illumination light adjusting unit 38 maintains the dimming signal at that time.

Figure 3A:
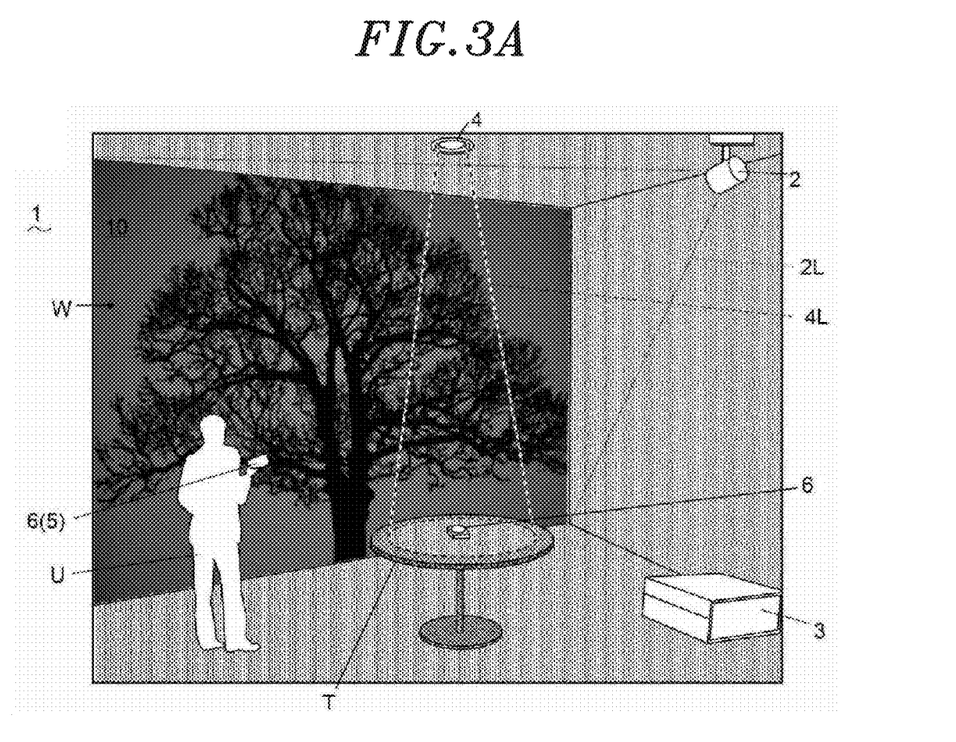
FIGS. 3A and 3B show an operation example of the illumination system.

The projector 2 projects an image that temporally changes to the object in the space 10. Therefore, when the image has a dark color or a low brightness, the effect of the projection light 2L from the projector 2 is reduced even if the illumination light 4L from the lighting device 4 is constant. For example, as shown in FIG. 3A, when the preset illuminance value is 500 lx and the illuminance value measured by the illuminance measurement unit 6 installed at the table T is 400 lx, the illuminance value difference becomes 100 lx. Thus, the control device 3 (the illumination light adjusting unit 38) increases the dimming rate of the lighting device 4 by changing the dimming signal transmitted to the lighting device 4 in a stepwise manner.

Figure 3B:
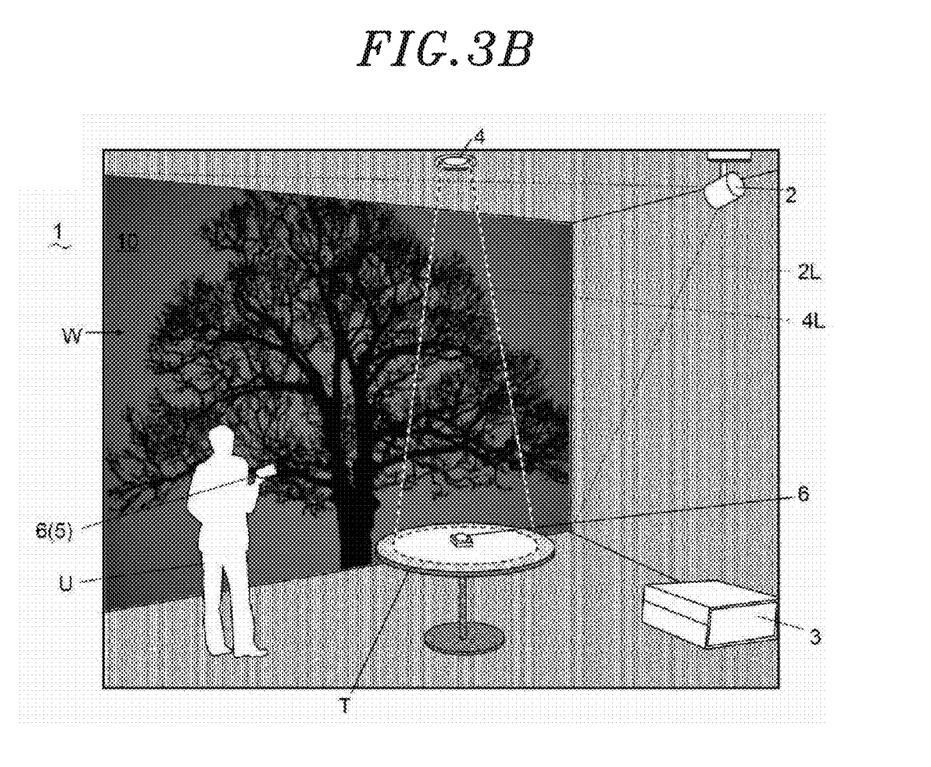

As shown in FIG. 3B, when the illuminance value measured by the illuminance measurement unit 6 becomes 500 lx which is equal to the preset illuminance value, the control device 3 maintains the illumination state of the lighting device 4 based on the dimming signal at that time. Accordingly, even when the brightness of the projection light 2L is decreased by the change of the image projected from the projector 2, the illuminance value on the table T serving as a working surface is maintained by the increase in brightness of the illumination light 4L from the lighting device 4. Therefore, the user U can obtain an illumination environment in which a visual work can be comfortably performed on the table T while enjoying the presentation of the image projected from the projector 2.

If the brightness of the illumination light 4L from the lighting device 4 is frequently changed according to frequent change of the image projected from the projector 2, a user U in an indoor space may feel uncomfortable. To that end, the difference calculation unit 37 (see FIG. 2) outputs to the illumination light adjusting unit 38 the data on the difference at a preset time interval, e.g., 30 seconds. Accordingly, the brightness of the illumination light 4L from the lighting device 4 is maintained at the same level for a predetermined period of time, 30 seconds in the present embodiment. As a result, the user U may not feel uncomfortable.

Figure 4:
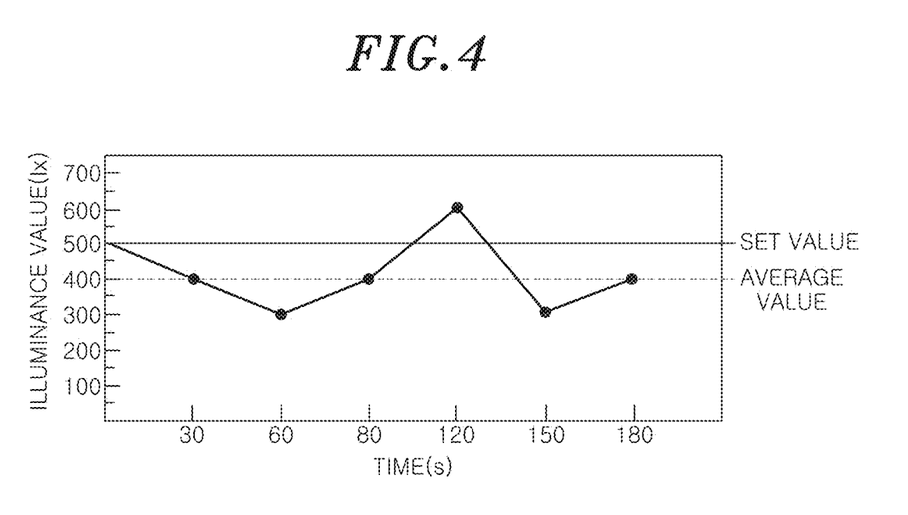
FIG. 4 shows a change pattern of an illuminance value of the illumination system.

The illuminance value storage unit 39 may output the data on the average of the stored illuminance values to the difference calculation unit 37 at a predetermined time interval. For example, when the predetermined time interval is 3 minutes (180 seconds) and, for the predetermined time, i.e., 3 minutes, the illuminance value measured by the illuminance measurement unit 6 varies in a range of 300 to 600 lx as shown in FIG. 4, the average of the illuminance (400 lx in the present embodiment) is calculated and the data on the average is outputted to the difference calculation unit 37.

Accordingly, the brightness of the illumination light 4L from the lighting device 4 is maintained for the predetermined time, i.e., 3 minutes in the present embodiment, and the illumination light 4L is irradiated based on the average, so that the actual illuminance value is not greatly different from the set value. As a result, the user U may not feel uncomfortable.

The illuminance value of the location where the illuminance measurement unit 6 is installed may be affected by not only the output value of the projection light 2L from the projector 2 but also the change in size of the projected image or the change in position of an area, which is drawn in a dark color such as black, in the projected image. Especially, when a moving image is projected from the projector 2, the illuminance value measured by the illuminance measurement unit 6 may be considerably changed in a short period of time. If the illumination light 4L from the lighting device 4 is considerably changed in order to deal with the considerable change in the illuminance value, the user U in an indoor space may feel uncomfortable. Besides, the projection light 2L may be intended to considerably change the illuminance value in a space for presentation for attracting attention to the image. In that case, if the illuminance value of the work surface is maintained by the illumination light 4L from the lighting device 4, the effect of the presentation of the image is decreased.

Therefore, the difference calculation unit 37 does not output the data on the difference to the illumination light adjusting unit 38 when the difference is greater than a preset threshold value. For example, when the difference is greater than 300 lx per 10 seconds, the difference calculation unit 37 does not output the data on the difference to the illumination light adjusting unit 38. In that case, the illumination light adjusting unit 38 keeps transmitting the dimming signal before the considerable change of the illuminance value to the lighting device 4. Accordingly, the considerable change in the illumination light 4L from the lighting device 4 is suppressed, so that the user U may not feel uncomfortable and the effect of the presentation of the image may be improved.

By reproducing the optical data stored in the optical data storage unit 35 (see FIG. 2) by using the control device 3, the projector 2 can perform repeat projection in which a series of images that change at a preset time interval are repeatedly projected. In the repeat projection, when the series of images are first projected from the projector 2, the illuminance measurement unit 6 measures respective illuminance values of the location while the series of images are first projected from the projector 2 and transmits the data on the measured illuminance values to the transmission/reception unit 31. The received data on the measured illuminance values is stored in the illuminance value storage unit 39. For the repeat projection of the series of images after the first projection, the illuminance measurement unit 6 does not measure the illuminance value of the location, and the illuminance value storage unit 39 outputs the data on the illuminance value stored for the first projection to the difference calculation unit 37. The difference calculation unit 37 calculates the difference between the preset illuminance value and the illuminance value outputted from the illuminance value storage unit 39. Accordingly, it is possible to decrease a period of time during which the illuminance measurement unit 6 measures the illuminance value, and decrease the number of transmission of the data on the illuminance value to the control device 3. As a result, the power consumption of the illuminance measurement unit 6 can be reduced. Especially, when the illuminance measurement unit 6 is of a battery-driven type, the waiting time of the illuminance measurement unit 6 can be increased.

Figure 5:
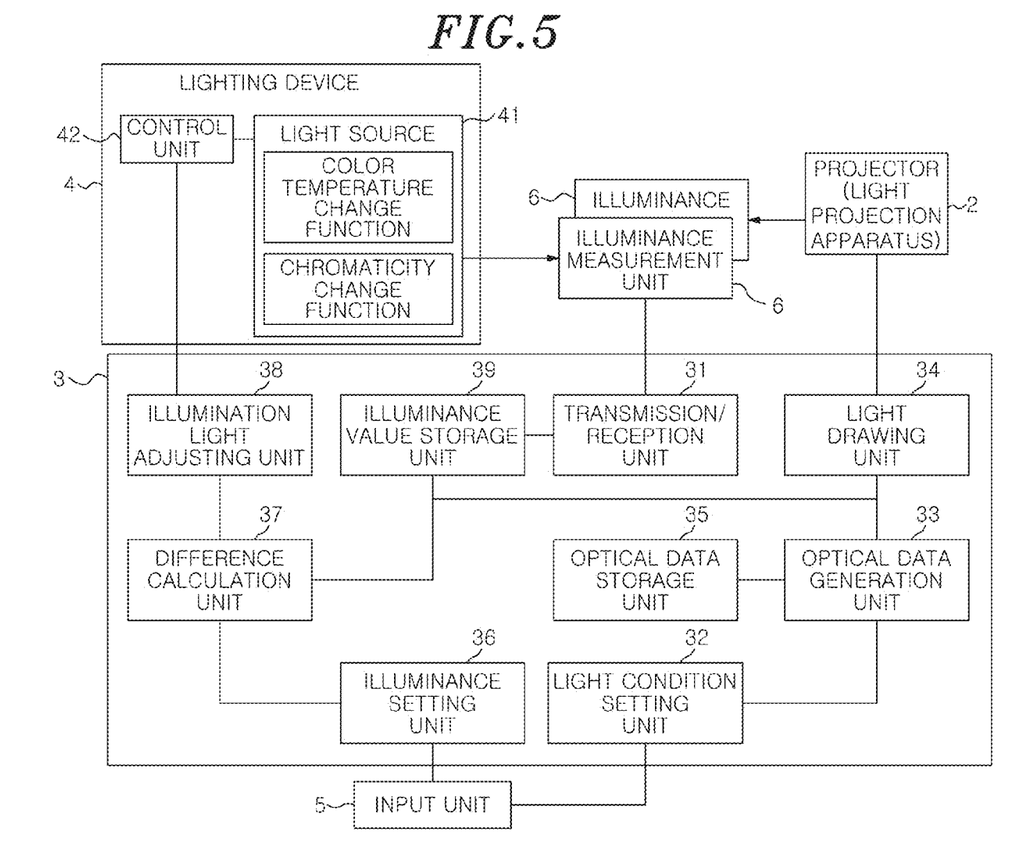
FIG. 5 is a block diagram showing a configuration of an illumination system according to a second embodiment.

Hereinafter, a light projection device according to a second embodiment will be described with reference to FIG. 5. In the illumination system 1 of the second embodiment, the light source 41 of the lighting device 4 has a color temperature change function of illuminating a space with an optional color temperature or a light color change function of illuminating a space with an optional light color. A color temperature or a chromaticity of a space can be inputted in advance into the illuminance setting unit 36 through the input unit 5. The illuminance setting unit 36 outputs to the difference calculation unit 37 the data on the set color temperature or the set chromaticity in addition to the data on the illuminance value which is described in the first embodiment. The illumination light adjusting unit 38 adjusts the color temperature or the chromaticity of the light irradiated from the lighting device 4 based on the image projected from the projector 2.

The light source 41 having a color temperature change function includes a plurality of LED light sources having different color temperatures ranging from daylight color to incandescent color (color temperature ranging from 7100K to 2600K). The light source 41 irradiates the illumination light 4L of an optional color temperature through appropriate control of the outputs of the LED light sources. The light source 41 having a chromaticity change function has a plurality of LED light sources capable of emitting lights of primary light colors, e.g., red (R), green (G), and blue (B), respectively. Accordingly, the light source 41 can irradiate the illumination light 4L of an optional chromaticity through appropriate control of the outputs of the LED light sources.

In the present embodiment, the optical data generation unit 33 generates an average color temperature or an average chromaticity of the projection light 2L based on the optical data generated by the optical data generation unit 33, and outputs the data on the average color temperature or the average color of the projection light 2L to the difference calculation unit 37. The difference calculation unit 37 calculates a difference between the data on the color temperature or the chromaticity set by the illuminance setting unit 36 and the data on the average color temperature or the average chromaticity which is received from the optical data generation unit 33, and outputs the data on the difference to the illumination light adjusting unit 38.

In the case of using the light source 41 capable of changing a color temperature, if the average color temperature of the image projected from the projector 2 is higher than a preset color temperature, the illumination light adjusting unit 38 decreases the color temperature of the illumination light 4L by increasing a light emission ratio of the LED lighting source having a low color temperature. The light source 41 capable of changing a light color temperature changes a color temperature of white light. However, in the case of using the light source 41 capable of changing a chromaticity, the illumination light 4L of every color including white light can be irradiated by changing a light emission ratio of each of the LED light sources of RGB.

In the present embodiment, even when the color temperature or the chromaticity of the projection light 2L is varied by the change of the image projected from the projector 2, the color temperature or the chromaticity of the work surface can be maintained at a preset value by complementarily changing the color temperature or the chromaticity of the illumination light 4L in response to the variation of the color temperature or the chromaticity of the projection light 2L. Therefore, the user U can obtain an illumination environment where a visual work can be comfortably done on the table T while enjoying the presentation of the image projected from the projector 2.

The disclosure is not limited to the above embodiments and may be variously modified. For example, there may be provided a plurality of projectors 2 and a plurality of lighting devices 4. In that case, different lights can be respectively projected or irradiated to a side surface or a rear surface of an object placed in a projection space of the projector 2, and a floor surface or a rear surface where a shadow of the object is projected. As a result, three-dimensional presentation can be performed.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An illumination system comprising:
a light projection device configured to project an image that temporally changes into a space;
an illuminance measurement unit configured to measure an illuminance value of a location where the illuminance measurement unit is placed in the space;
a lighting device having a dimming function for illuminating the location in the space with a brightness; and
a control device configured to control the light projection device and the lighting device,
wherein the control device includes:
an illuminance setting unit configured to set an illuminance value of the location;
a difference calculation unit configured to calculate a difference between the illuminance value set by the illuminance setting unit and the illuminance value measured by the illuminance measurement unit; and
an illumination light adjusting unit configured to adjust a brightness of the lighting device such that the difference calculated by the difference calculation unit is reduced,
wherein the difference calculation unit outputs data on the difference to the illumination light adjusting unit at a preset time interval, and
wherein when the difference is greater than or equal to a preset threshold value, the difference calculation unit does not output the data on the difference to the illumination light adjusting unit.

2. The illumination system of claim 1, wherein the control device further includes an illuminance value storage unit configured to store the illuminance value measured by the illuminance measurement unit,
wherein the illuminance value storage unit outputs data on an average of stored illuminance values to the difference calculation unit at a preset time interval.

3. The illumination system of claim 2, wherein the light projection device repeatedly projects a series of images that temporally change at a preset time interval, and
wherein the illuminance measurement unit measures respective illuminance values of the location while the series of images are first projected from the light projection device, and transmits data on the measured illuminance values to the control device, and the data on the measured illuminance values is stored in the illuminance value storage unit.

4. The illumination system of claim 3, wherein for a repeated projection of the series of images after the first projection, the illuminance measurement unit does not measure the illuminance value of the location, and the illuminance value storage unit outputs the data on the stored illuminance values for the first projection to the difference calculation unit, and
wherein the difference calculation unit calculates a difference between a preset illuminance value and the illuminance values output from the illuminance value storage unit.

5. The illumination system of claim 1, wherein the lighting device performs a color temperature change function for illuminating the location with a color temperature, and
wherein the illumination light adjusting unit adjusts a color temperature of a light irradiated from the lighting device in response to the image projected from the light projection device.

6. The illumination system of claim 1, wherein the lighting device performs a light color change function for illuminating the location with a light color, and
wherein the illumination light adjusting unit adjusts a chromaticity of a light irradiated from the lighting device in response to the image projected from the light projection device.

7. An illumination system comprising:
a light projector configured to project an image that temporally changes, into a space;
a sensor configured to measure an illuminance value of a location where the sensor is provided in the space;
a light having a dimming function for illuminating the location in the space with a brightness; and
a controller configured to control the light projector and the light,
wherein the controller is configured to perform operations comprising:
setting an illuminance value of the location;
calculating a difference between the illuminance value that is set and the illuminance value that is measured; and
adjusting a brightness of the light such that the difference calculated is reduced,
wherein data on the difference is output at a preset time interval, and
wherein when the difference is greater than or equal to a preset threshold value, the data on the difference is not output.

8. The illumination system of claim 7, wherein the operations further comprise:
storing in memory the illuminance value measured by the sensor,
wherein the data on an average of stored illuminance values is output at a preset time interval.

9. The illumination system of claim 8, wherein the light projector repeatedly projects a series of images that temporally change at a preset time interval, and
wherein the sensor measures respective illuminance values of the location while the series of images are first projected from the light projector, and transmits data on the measured illuminance values to the controller, and the data on the measured illuminance values is stored in the memory.

10. The illumination system of claim 9, wherein for a repeated projection of the series of images after the first projection, the sensor does not measure the illuminance value of the location, and the memory outputs the data on the stored illuminance values for the first projection, and wherein the operations further comprise calculating a difference between a preset illuminance value and the illuminance values output from the memory.

11. The illumination system of claim 7, wherein the light performs a color temperature change function for illuminating the location with a color temperature, and
wherein the operations further comprise adjusting a color temperature of a light irradiated from the light in response to the image projected from the light projector.

12. The illumination system of claim 7, wherein the light performs a light color change function for illuminating the location with a light color, and
wherein the operations further comprise adjusting a chromaticity of a light irradiated from the light in response to the image projected from the light projector.

* * * * *